US008992080B2

(12) United States Patent
Lepidis et al.

(10) Patent No.: US 8,992,080 B2
(45) Date of Patent: Mar. 31, 2015

(54) TEMPERATURE DETECTION DEVICE HAVING A DIODE AND AN ANALOG-DIGITAL CONVERTER

(75) Inventors: Polichronis Lepidis, Reutlingen (DE); Uwe Schiller, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 13/175,335

(22) Filed: Jul. 1, 2011

(65) Prior Publication Data
US 2012/0002700 A1 Jan. 5, 2012

(30) Foreign Application Priority Data

Jul. 2, 2010 (DE) .......... 10 2010 030 843

(51) Int. Cl.
*G01K 7/00* (2006.01)
*G01K 7/01* (2006.01)
(52) U.S. Cl.
CPC .............. *G01K 7/01* (2013.01); *G01K 2219/00* (2013.01)
USPC ........... 374/172; 374/142; 374/170; 374/178; 374/173
(58) Field of Classification Search
USPC ...................... 374/172, 173, 178, 170, 142
See application file for complete search history.

(56) References Cited

U.S. PATENT DOCUMENTS

| 5,453,682 | A * | 9/1995 | Hinrichs et al. | 324/132 |
| 6,808,307 | B1 * | 10/2004 | Aslan et al. | 374/178 |
| 7,010,440 | B1 * | 3/2006 | Lillis et al. | 702/65 |
| 7,048,438 | B2 * | 5/2006 | Breinlinger | 374/178 |
| 7,686,508 | B2 * | 3/2010 | Lin et al. | 374/178 |
| 2007/0158776 | A1 * | 7/2007 | Julio et al. | 257/486 |
| 2010/0011856 | A1 * | 1/2010 | Nagata | 73/504.12 |
| 2010/0124251 | A1 * | 5/2010 | Peterson et al. | 374/171 |

FOREIGN PATENT DOCUMENTS

| CN | 101228422 | 7/2008 |
| JP | 2000-304623 | 11/2000 |
| JP | 2008-58298 | 3/2008 |
| WO | WO 03/106945 | 12/2003 |

* cited by examiner

*Primary Examiner* — Mirellys Jagan
(74) *Attorney, Agent, or Firm* — Kenyon & Kenyon LLP

(57) ABSTRACT

A temperature detection device includes a diode and an analog-digital converter. An output voltage signal of the diode is applicable to an input of the analog-digital converter. The temperature detection device is adapted for the purpose of coupling a reference voltage of the analog-digital converter and the diode current of the diode such that effects of variations of the reference voltage or the diode current on the digital output signal of the analog-digital converter are partially or completely suppressed.

15 Claims, 2 Drawing Sheets

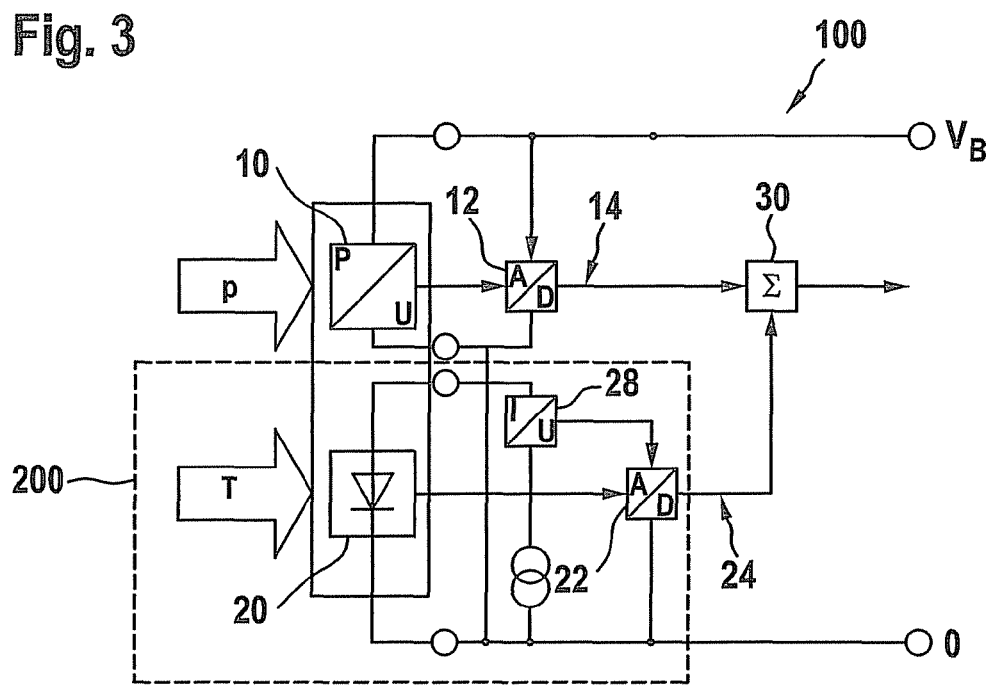

United States Patent US 8,992,080 B2

TEMPERATURE DETECTION DEVICE HAVING A DIODE AND AN ANALOG-DIGITAL CONVERTER

CROSS-REFERENCE TO RELATED APPLICATIONS

The present application claims priority to Application No. 10 2010 030 843.9, filed in the Federal Republic of Germany on Jul. 2, 2010, which is expressly incorporated herein in its entirety by reference thereto.

FIELD OF THE INVENTION

The present invention relates to a temperature detection device having a diode and an analog-digital converter, a measuring device which includes a temperature detection device, a method for digitally ascertaining a temperature, and a method for suppressing temperature effects on the ascertainment of a variable to be measured.

BACKGROUND INFORMATION

In conventional temperature detection devices, the fact that the characteristic curve of a diode has a strong temperature dependence is utilized.

Integrating such temperature detection devices in measuring devices, which include a sensor for detecting a variable to be measured and in which the output signal of the sensor is a function of the ambient temperature, is also conventional. Examples of such sensors are micromechanical pressure, acceleration, or yaw-rate sensors. For their usage in corresponding applications, it is necessary that a value, which is independent of the ambient temperature, of the variable to be measured is calculated.

In many micromechanical sensors, the measured variable, for example, pressure, acceleration, or yaw rate, is detected by the change in piezoelectric resistances or capacitances and converted into an electrical voltage.

The ambient temperature represents a disturbance variable, which has an influence on the electrical output voltage of the sensor element. To be able to compensate for the influence of the ambient temperature within an integrated circuit, it must also be detected. Resistors or diodes are used to detect the temperature. Diodes are typically powered using a constant current to generate a temperature-dependent voltage.

The signal processing for the purposes of temperature compensation, amplification, or linearization is implemented employing digital integrated circuits. Analog-digital converters are used to convert the analog electrical voltages of diode and sensor element into a digital numeric value which is processable by a computer unit.

In order to minimize the conversion error due to variations in the supply voltage for the pressure signal, the pressure sensor and the analog-digital converter are operated using the same supply voltage. The sensitivity of the pressure sensor thus decreases upon reduction of the supply voltage, and the sensitivity of the analog-digital converter therefore proportionally increases inversely, whereby the digital numeric value at the output of the analog-digital converter remains unchanged (ratiometric measurement).

The diode is operated using a constant current which is largely independent of the supply voltage, so that the output voltage of the diode is also largely independent of the supply voltage. If the supply voltage drops, the diode delivers an unchanged output voltage, while the sensitivity of the analog-digital converter rises, however, and results in a higher digital numeric value at the output of the analog-digital converter. A misinterpretation of the diode output voltage and an incorrect ascertainment of the measured value after the temperature compensation in the signal pathway thus occur.

SUMMARY

According to example embodiments of the present invention, a temperature detection device having a diode, in particular a semiconductor diode, and an analog-digital converter is provided. An output voltage signal of the diode is applicable to an input of the analog-digital converter. The temperature detection device is adapted for the purpose of coupling a reference voltage of the analog-digital converter and a diode current of the diode such that effects of variations of the reference voltage or the diode current on the digital output signal of the analog-digital converter are partially or completely suppressed.

A reference voltage is understood as any voltage to which the analog-digital converter compares the input voltage applied to its input and on the basis of which the analog-digital converter generates a digital output signal. A reference voltage of the analog-digital converter may be a supply voltage of the analog-digital converter within the present context.

In example embodiments, it is provided that the temperature detection device includes a voltage-controlled current source. The voltage-controlled current source is activatable by the reference voltage of the analog-digital converter and regulates the diode current such that effects of variations of the reference voltage on the digital output signal of the analog-digital converter are partially or completely suppressed.

Thus, for example, a change in the supply voltage at the analog-digital converter results in a change of offset and sensitivity. Offset and sensitivity changes result in a change in the digital numeric value after the analog-digital conversion.

The change in the digital numeric value in the event of equal temperature and equal diode current would be interpreted as a change in the temperature value. However, through the regulation of the diode current by the voltage-controlled current source, the change in the digital numeric value is either reduced or caused to disappear, resulting in an ascertainment of the temperature which is independent of variations of the supply voltage.

In example embodiments, it is provided that the temperature detection device includes a current-controlled voltage source. The current-controlled voltage source is activated by the diode current and regulates the reference voltage of the analog-digital converter such that effects of variations of the diode current on the digital output signal of the analog-digital converter are partially or completely suppressed.

Variations of the diode current result, in the event of an identical temperature, in an output voltage change at the diode. This output voltage change would be interpreted as a change in the temperature. The effects of the variations of the diode current are compensated for by regulating the reference voltage via the current-controlled voltage source.

A further aspect relates to a measuring device having a sensor for detecting a physical variable to be measured, an output signal of the sensor being a function of the temperature. The measuring device includes a temperature detection device. To minimize the influence of the temperature on the measurement result, the temperature is ascertained on the basis of a change in the output voltage of a diode included in the temperature detection device and used for the compensation. By using the temperature detection device, precise compensation of the temperature influence is possible through a precise determination of the temperature.

A computer unit may be provided in the measuring device, which is adapted for the purpose of calculating a measured value of the physical variable, which is largely independent of an influence of the temperature, on the basis of the output signal of the sensor and the digital output signal of the analog-digital converter. This may be performed, for example, by a calculation specification which is applied to the digital values ascertained in the measuring device for the output voltage of the sensor element and the temperature diode.

The sensor may be a pressure, acceleration, or yaw-rate sensor, for example. It may be arranged as a sensor which detects a change in piezoelectric resistances or capacitances.

A further aspect relates to a method for digitally ascertaining a temperature. An output voltage signal of a diode, in particular a semiconductor diode, is applied to an input of an analog-digital converter. A digital output signal of the analog-digital converter corresponds in this case to a temperature value. A reference voltage of the analog-digital converter and a diode current of the diode are coupled such that effects of variations of the reference voltage or the diode current on the digital output signal of the analog-digital converter are partially or completely suppressed.

In example embodiments of the method, it is provided that a voltage-controlled current source is controlled by the reference voltage of the analog-digital converter and regulates the diode current such that effects of variations of the reference voltage on the digital output signal of the analog-digital converter are partially or completely suppressed. By using a voltage-controlled current source for the diode current, the output voltage of the diode is compensated for such that, for example, a change in the supply voltage of the analog-digital converter does not result in a change in the digital numeric value at the output of the analog-digital converter.

In example embodiments of the method, it is provided that a current-controlled voltage source is controlled by the diode current and regulates the reference voltage of the analog-digital converter such that effects of variations of the diode current on the digital output signal of the analog-digital converter are partially or completely suppressed. By using a current-controlled voltage source for the analog-digital converter, for example, the supply voltage of the analog-digital converter is regulated as a function of the diode current such that current-related changes in the diode output voltage do not result in changes in the digital numeric value at the output of the analog-digital converter.

A further aspect relates to a method for suppressing temperature effects on the ascertainment of a variable to be measured, in particular a pressure, an acceleration, or a yaw rate. In this case, a temperature is ascertained by using the method described herein for digitally ascertaining a temperature. A measuring signal of the variable to be measured is preferably digitized in this case and supplied jointly with the digitally ascertained temperature to a computing unit.

Exemplary embodiments of the present invention are explained in greater detail on the basis of the drawings and the following description.

BRIEF DESCRIPTION OF THE DRAWINGS

FIG. 3 shows a pressure measuring device having a temperature detection device according to an exemplary embodiment of the present invention.

DETAILED DESCRIPTION

Figure 1:
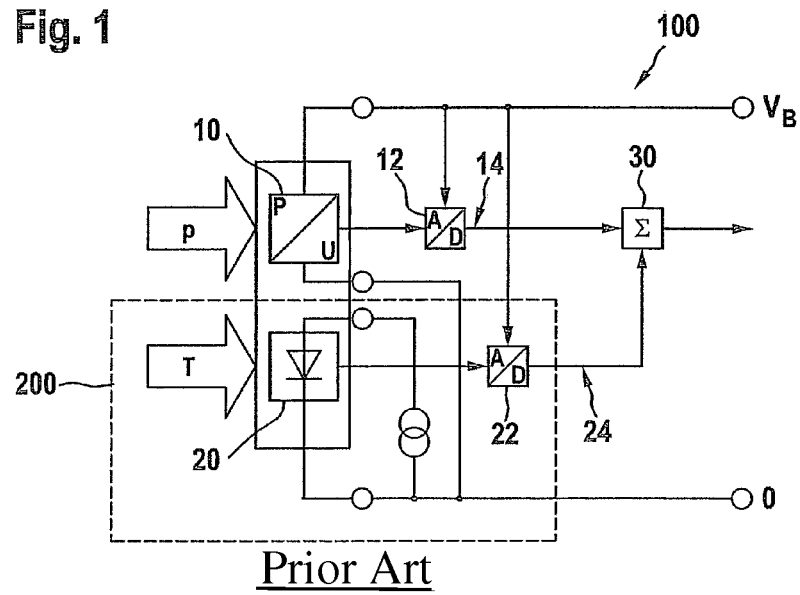
FIG. 1 shows a conventional pressure measuring device.

FIG. 1 shows a conventional pressure measuring device, identified as a whole by reference numeral 100, having a pressure sensor element 10, which detects a pressure through the change in a piezoelectric resistance and converts it into an electrical measuring voltage. The measuring voltage is supplied to a first analog-digital converter 12, which generates a digital signal 14. In this case, the signal of pressure sensor element 10 is converted ratiometrically, i.e., pressure sensor element 10 and analog-digital converter 12 are supplied with the same voltage. The influence of variations of the voltage at pressure sensor element 10 and first analog-digital converter 12 is thus compensated for. Digital signal 14 is temperature-dependent and is supplied to a computer unit 30, which calculates a pressure measured value which is largely independent of the influence of the temperature by using a temperature value ascertained by a temperature detection device, which is identified as a whole by reference numeral 200.

Temperature detection device 200 includes a semiconductor diode 20, which is supplied by a constant diode current. An output voltage signal is tapped at semiconductor diode 20 and supplied to a second analog-digital converter 22, which ascertains a digital temperature value 24 and also supplies it to computer unit 30.

Figure 2:
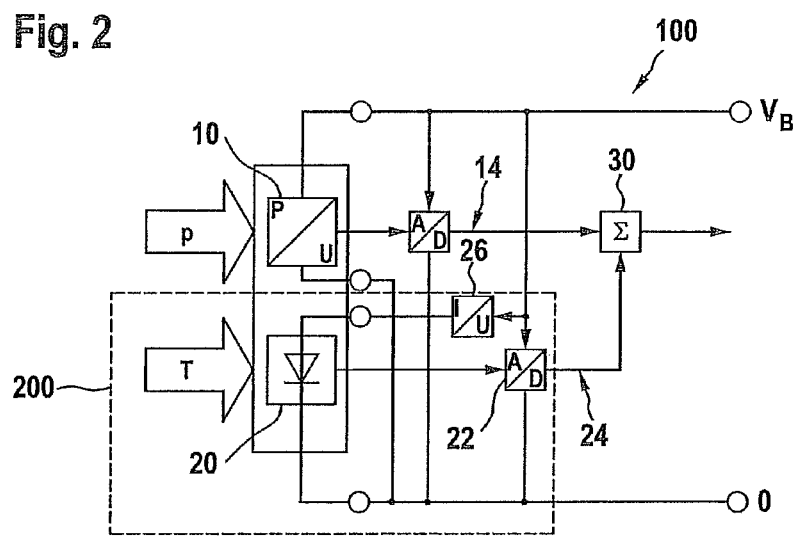
FIG. 2 shows a pressure measuring device having a temperature detection device according to an exemplary embodiment of the present invention.

Temperature detection device 200 shown in FIG. 2 includes a voltage-controlled current source 26. Supply voltage VB is used as the control voltage of voltage-controlled current source 26. The output of voltage-controlled current source 26 supplies semiconductor diode 20 with a diode current.

In the event of an increase of supply voltage VB, the sensitivity of second analog-digital converter 22 would decrease in the case of a constant diode current through semiconductor diode 20. In order to compensate for the effect of the lower sensitivity of second analog-digital converter 22, the diode current is increased by voltage-controlled current source 26, so that the output voltage of the semiconductor diode is also increased. Voltage-controlled current source 26 is arranged such that the two effects precisely compensate for one another, and digital temperature value 24 is independent of the change in supply voltage VB.

Vice versa, in the event of a reduction of supply voltage VB, the sensitivity of second analog-digital converter 22 increases. The output voltage of semiconductor diode 20 is decreased in that voltage-controlled current source 26 reduces the diode current flowing through semiconductor diode 20. Voltage-controlled current source 26 is again arranged such that a compensation of the two effects results, so that digitally ascertained temperature value 24 remains unchanged.

The temperature detection device shown in FIG. 3 includes a current-controlled voltage source 28. The diode current flowing through semiconductor diode 20 is used as the control current of current-controlled voltage source 28. Current-controlled voltage source 28 provides a supply voltage for second analog-digital converter 22.

If the diode current decreases, the output voltage of semiconductor diode 20 also decreases. In order to compensate for the reduction of the output voltage of semiconductor diode 20 and to obtain a digital temperature value 24 which is independent of the diode current at the output of second analog-digital converter 22, the sensitivity of second analog-digital converter 22 is increased by a reduction of the supply voltage provided by current-controlled voltage source 28. Current-controlled voltage source 28 is arranged such that digital temperature value 24 remains largely constant in the event of a variation of the diode current.

Vice versa, the output voltage tapped at semiconductor diode 20 increases in the event of an increase of the diode current, so that current-controlled voltage source 28 correspondingly increases the supply voltage of second analog-digital converter 22. The sensitivity of analog-digital converter 22 is reduced, and precisely compensates for the effect of the increase of the diode current.

What is claimed is:

1. A temperature detection device, comprising:
   a diode that permits current in a forward direction and blocks current in a reverse direction;
   an analog-digital converter, an output voltage signal of the diode being applicable to an input of the analog-digital converter; and
   a voltage-controlled current source having a control voltage input coupled to a reference voltage input of the analog-digital converter and an output coupled to the diode;
   wherein a reference voltage of the analog-digital converter and a diode current of the diode are coupleable such that effects of variations of the reference voltage or the diode current on a digital output signal of the analog-digital converter are at least one of (a) partially and (b) completely suppressed.

2. The temperature detection device according to claim 1, wherein the diode includes a semiconductor diode.

3. The temperature detection device according to claim 1, wherein the voltage-controlled current source is activatable by the reference voltage of the analog-digital converter and is adapted to regulate the diode current such that effects of variations of the reference voltage on the digital output signal of the analog-digital converter are at least one of (a) partially and (b) completely suppressed.

4. The temperature detection device of claim 1, wherein the control voltage input is an amplifier supply voltage.

5. A temperature detection device, comprising:
   a diode; and
   an analog-digital converter, an output voltage signal of the diode being applicable to an input of the analog-digital converter; and
   a current-controlled voltage source activatable by the diode current and adapted to regulate the reference voltage of the analog-digital converter such that effects of variations of the diode current on the digital output signal of the analog-digital converter are at least one of (a) partially and (b) completely suppressed, wherein a reference voltage of the analog-digital converter and a diode current of the diode are coupleable such that effects of variations of the reference voltage or the diode current on a digital output signal of the analog-digital converter are at least one of (a) partially and (b) completely suppressed.

6. A measuring device, comprising:
   a sensor adapted to detect a physical variable to be measured, an output signal of the sensor having a temperature dependence; and
   a temperature detection device including:
      a diode that permits current in a forward direction and blocks current in a reverse direction;
      an analog-digital converter coupled to the sensor, an output voltage signal of the diode being applicable to an input of the analog-digital converter; and
      a voltage-controlled current source having a control voltage input coupled to a reference voltage input of the analog-digital converter and an output coupled to the diode;
   wherein a reference voltage of the analog-digital converter and a diode current of the diode are coupleable such that effects of variations of the reference voltage or the diode current on a digital output signal of the analog-digital converter are at least one of (a) partially and (b) completely suppressed.

7. The measuring device according to claim 6, further comprising a computer unit adapted to calculate a measured value of the physical variable, which is substantially independent of an influence of the temperature, in accordance with the output signal of the sensor and the digital output signal of the analog-digital converter.

8. The measuring device according to claim 6, wherein the sensor includes at least one of (a) a pressure sensor, (b) an acceleration sensor, and (c) a yaw-rate sensor.

9. A method for digitally ascertaining a temperature, comprising:
   applying an output voltage signal of a diode to an input of an analog-digital converter, the diode permitting current in a forward direction and blocking current in a reverse direction;
   outputting a digital output signal of the analog-digital converter corresponding to a temperature value; and
   adjusting an output of a voltage-controlled current source supplied to the diode based on a reference voltage at the analog-digital converter such that effects of variations of the reference voltage or a diode current on the digital output signal of the analog-digital converter are at least one of (a) partially and (b) completely suppressed.

10. The method according to claim 9, wherein the diode includes a semiconductor diode.

11. The method according to claim 9, further comprising controlling the voltage-controlled current source by the reference voltage of the analog-digital converter and regulating the diode current such that effects of variations of the reference voltage on the digital output signal of the analog-digital converter are at least one of (a) partially and (b) completely suppressed.

12. A method for digitally ascertaining a temperature, comprising:
   applying an output voltage signal of a diode to an input of an analog-digital converter;
   outputting a digital output signal of the analog-digital converter corresponding to a temperature value;
   coupling a reference voltage of the analog-digital converter and a diode current of the diode such that effects of variations of the reference voltage or the diode current on the digital output signal of the analog-digital converter are at least one of (a) partially and (b) completely suppressed; and
   controlling a current-controlled voltage source by the diode current and regulating the reference voltage of the analog-digital converter such that effects of variations of the diode current on the digital output signal of the analog-digital converter are at least one of (a) partially and (b) completely suppressed.

13. A method for suppressing temperature effects on ascertaining a variable to be measured, comprising:
   digitally ascertaining a temperature including:
      applying an output voltage signal of a diode to an input of an analog-digital converter, the diode permitting current in a forward direction and blocking current in a reverse direction;

outputting a digital output signal of the analog-digital converter corresponding to a temperature value; and adjusting an output of a voltage-controlled current source supplied to the diode based on a reference voltage at the analog-digital converter such that effects of variations of the reference voltage or a diode current on the digital output signal of the analog-digital converter are at least one of (a) partially and (b) completely suppressed.

14. The method according to claim 13, wherein the variable includes at least one of (a) a pressure, (b) an acceleration, and (c) a yaw rate.

15. The method according to claim 13, wherein further comprising digitizing a measuring signal of the variable to be measured and supplying the digitized measuring signal with the digitally ascertained temperature to a computer unit.

\* \* \* \* \*